Figure 9:
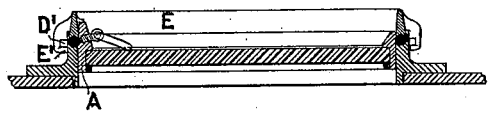

(No Model.) 5 Sheets—Sheet 1.
E. J. PRESTON, E. W. DE RUSETT, W. MULLAN & J. McKIRDY.
SIDE SCUTTLE FOR SHIPS.
No. 428,227. Patented May 20, 1890.
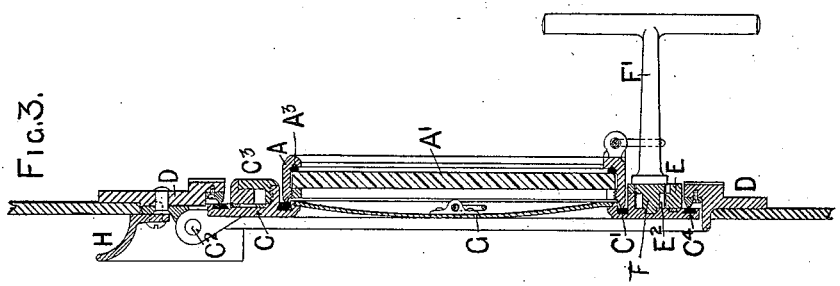
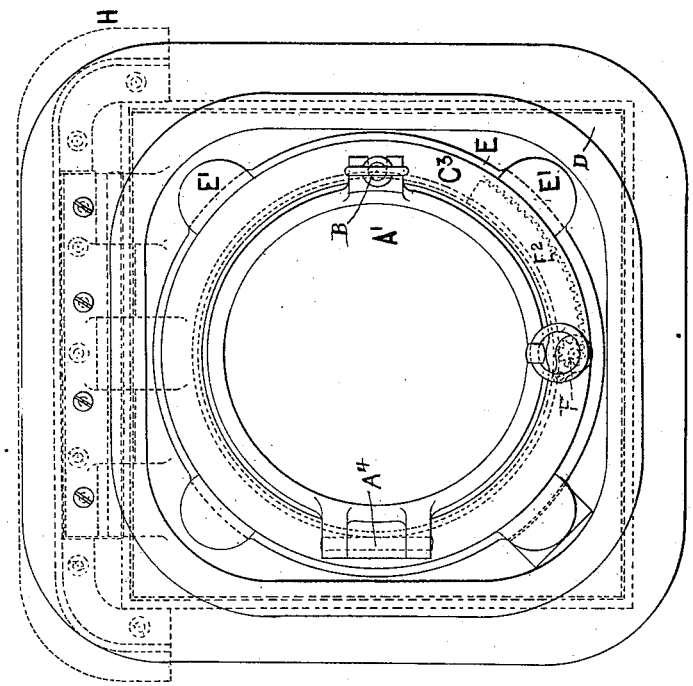
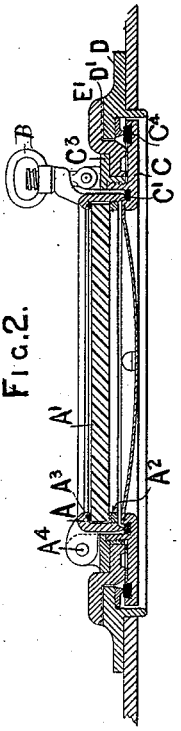

(No Model.) 5 Sheets—Sheet 2.
E. J. PRESTON, E. W. DE RUSETT, W. MULLAN & J. McKIRDY.
SIDE SCUTTLE FOR SHIPS.
No. 428,227. Patented May 20, 1890.
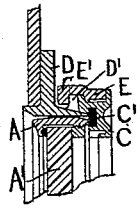
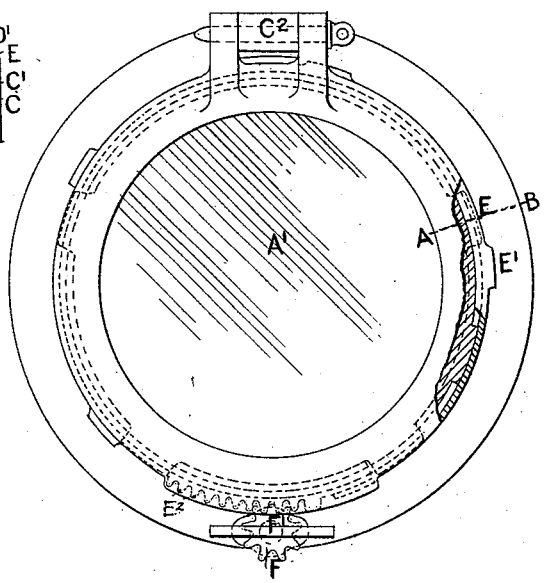
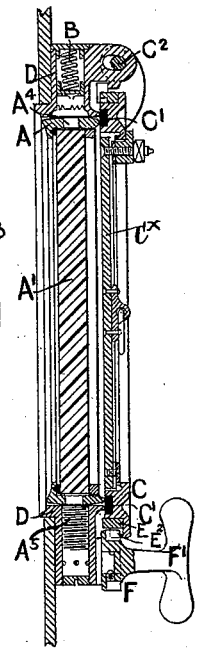
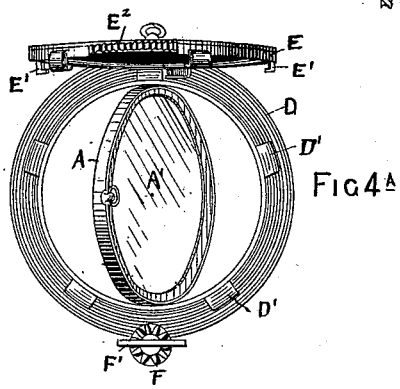

(No Model.) 5 Sheets—Sheet 3.

E. J. PRESTON, E. W. DE RUSETT, W. MULLAN & J. McKIRDY.
SIDE SCUTTLE FOR SHIPS.

No. 428,227. Patented May 20, 1890.

(No Model.) 5 Sheets—Sheet 4.
E. J. PRESTON, E. W. DE RUSETT, W. MULLAN &
J. McKIRDY.
SIDE SCUTTLE FOR SHIPS.
No. 428,227. Patented May 20, 1890.
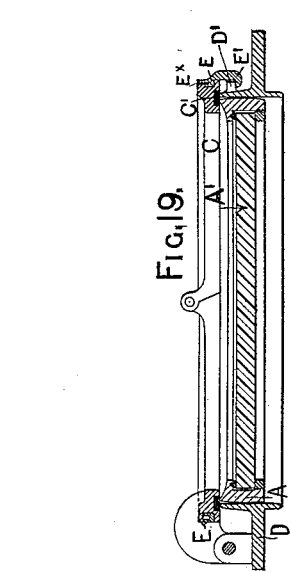
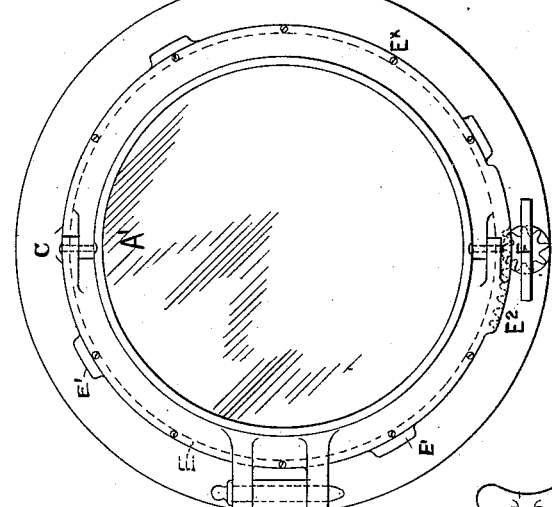
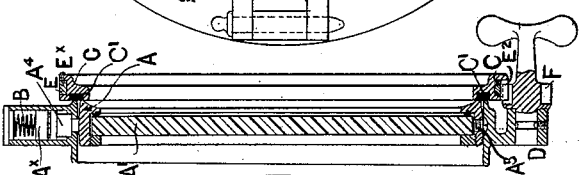
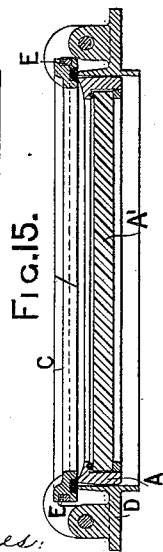
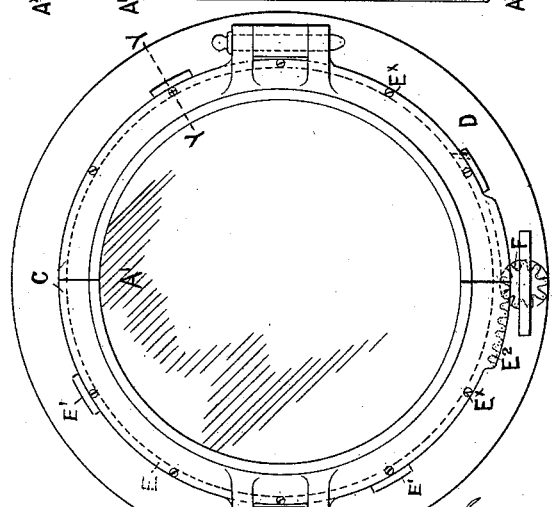
Witnesses:
H. B. Kingsbury
C. G. Northrup
Inventors:
Edwin J. Preston
Edwin W. de Rusett
William Mullan
John McKirdy
by William G. Potter atty (No Model.) 5 Sheets—Sheet 5.
E. J. PRESTON, E. W. DE RUSETT, W. MULLAN &
J. McKIRDY.
SIDE SCUTTLE FOR SHIPS.
No. 428,227. Patented May 20, 1890.
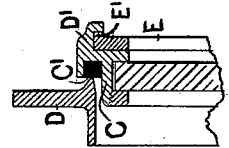
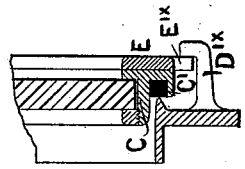
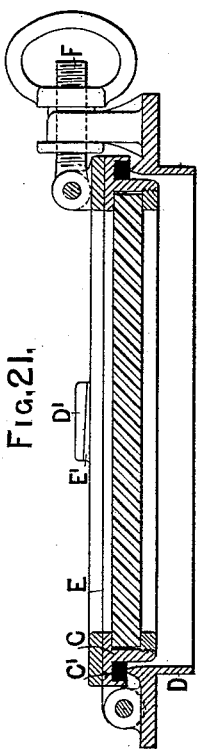
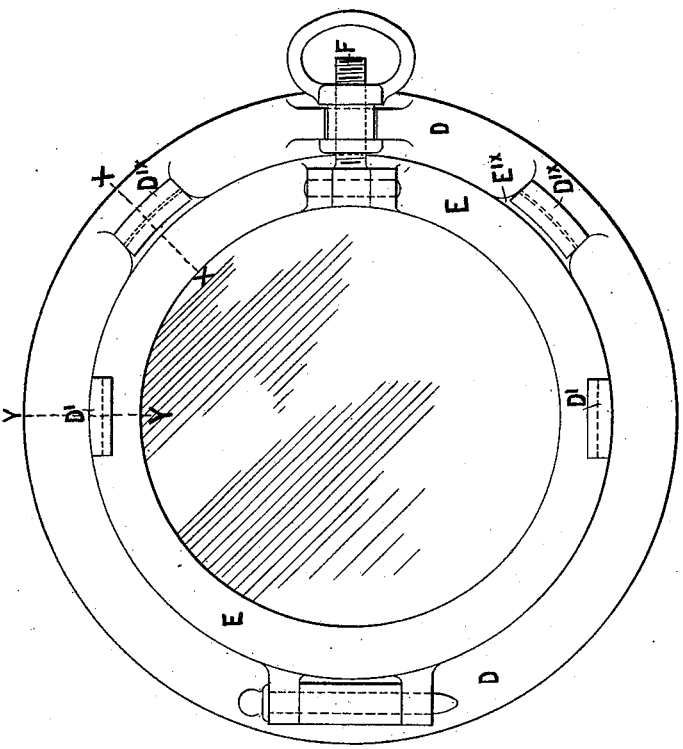

UNITED STATES PATENT OFFICE.

EDWIN JAMES PRESTON, OF LONDON, AND EDWIN WILLIAM DE RUSETT, OF CROYDON, NEAR LONDON, ENGLAND, WILLIAM MULLAN, OF BELFAST, IRELAND, AND JOHN McKIRDY, OF LONDON, ASSIGNORS TO J. STONE & CO., OF LONDON, ENGLAND.

SIDE SCUTTLE FOR SHIPS.

SPECIFICATION forming part of Letters Patent No. 428,227, dated May 20, 1890.

Application filed January 24, 1890. Serial No. 337,943. (No model.) Patented in England June 30, 1886, No. 9,543, July 1, 1886, No. 8,614, September 4, 1886, No. 11,253, and August 19, 1887, No. 11,366; and in Germany January 8, 1889, No. 47,952.

*To all whom it may concern:*

Be it known that we, EDWIN JAMES PRESTON, of the firm of J. Stone & Company, of Deptford, London, England, and EDWIN WILLIAM DE RUSETT, of Croydon, near London, England, WILLIAM MULLAN, of Belfast, Ireland, and JOHN McKIRDY, residing in London, England, subjects of the Queen of Great Britain, have invented certain new and useful Improvements in Side Scuttles for Ships, (for which Letters Patent have been granted in Great Britain, under date of July 1, 1886, No. 8,614; under date of September 4, 1886, No. 11,253; under date of June 30, 1886, No. 9,543, and under date of August 19, 1887, No. 11,366; in Germany, under date of January 8, 1889, No. 47,952,) of which the following is a specification, reference being had to the accompanying drawings.

These side scuttles are particularly applicable to large passenger-ships, troop-ships, and war-ships, and offer great advantages as to facility for quickly opening and quickly and tightly closing, and as to strength, so that they can be made larger and the glass part is not damaged by undue or unequal strain.

The various modifications to be described have this in common, that the foundation-frame of the scuttle-door (which latter is pivoted thereto centrally or at one side) near its circumference has three or more inclined plane or wedge pieces which can engage with corresponding cleats on a circular or other ring, which is capable of being turned or slid by some suitable means. By the turning or sliding of the ring the wedge-pieces are made to engage with or be freed from the cleats, and so that the scuttle-door, with or without an inner dead-door, is or are thereby closed tightly in or against the foundation-frame, or released for being opened.

In the following we describe some suitable forms or samples of side scuttles constructed according to this invention.

Figure 7:
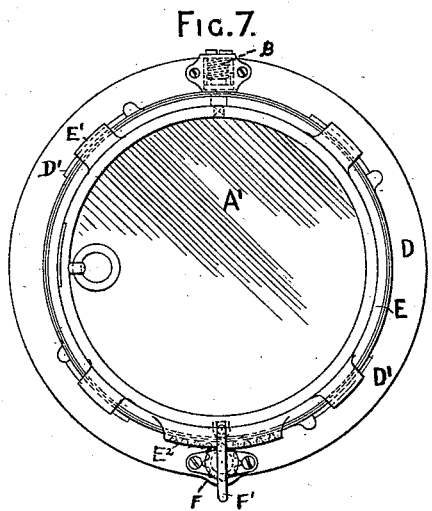
Figure 8:
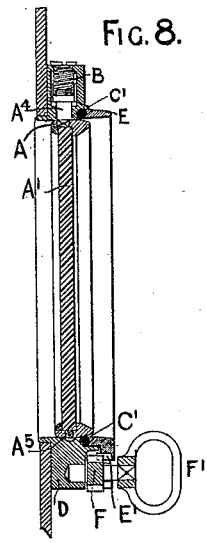

Figure 1 is a view of the scuttle from the cabin or inside of the ship; Fig. 2, a horizontal plan section, and Fig. 3 a vertical section. Fig. 4 shows another form of scuttle from the inside; Fig. 5, a vertical section; Fig. 6, a section on line A B of Fig. 4, and Fig. 4$^a$ a perspective view. Fig. 7 is inside view of another form; Fig. 8, a vertical section, and Fig. 9 a horizontal section. Fig. 10 is an inside view of another modification, Fig. 11 being a vertical section, and Fig. 12 a part section on line A B. Figs. 13, 14, and 15 are inside view, vertical section, and plan section; and Fig. 16, a part section on line Y Y of another modification. Figs. 17, 18, and 19 are inside view, vertical section, and plan section of yet another modification. Fig. 20 is an inside view; Fig. 21, a horizontal section of another modification; and Figs. 22 and 23, part sections on lines X X and Y Y, respectively, of Fig. 20.

In Figs. 1, 2, and 3, A is the glazed door, with glass frame A', elastically fixed by the screwed ring A$^2$ and rubber ring A$^3$. The door A, being pivoted or hinged at one side by hinge A$^4$ and held closed at the other side in the usual manner by means of screw and ring nut B, is by the latter, with its narrow rim-edge, held tightly against the rubber ring C'. This latter is contained in a larger door C of about square shape with more or less rounded corners, as desired. The door C is hinged at C$^2$ to the foundation-frame D, and has a rubber packing-ring C$^4$ for making tight joint with the frame D. The door C has a projecting rim C$^3$, between which and the foundation-plate D there is the rotatable ring E, provided with four cleats or lugs E', having slanting or wedge-shaped under sides, the frame D having four corresponding wedge-faces D', which can be made to engage therewith. For rotating the ring E, it is provided with teeth at E$^2$, into which gears the detachable pinion F with handle F', the latter being of a suitable length for being clear of any iron-work or wood-work inside of the skin of the vessel to which the frame D is fixed. On turning the pinion F one way or the other the cleats E' on the ring E will be turned upon or off from the wedge-pieces on the frame D, thereby respectively pressing the joint-ring $C^4$ of the door C tightly against the narrow rim of the frame D or freeing it therefrom, so that the door C then can be swung upon its hinge $C^2$ outside the ship. Instead of the pinion F and row of teeth $E^2$ we may in this and the following forms use a worm and wheel; but we prefer a pinion. G is a lid, in this case answering the purpose of a so-called "dead-door," and which may or may not be put into a recess formed in the inside of the frame D for excluding the light and protecting the glass pane A'. H is a guard for preventing water from deck-washing entering the scuttle. By this form of scuttle we gain the facility of either giving a very large opening by the door C or a smaller opening by the glazed door A, and all conveniently operated from inside the ship, and so that the glass pane A' is not exposed to breakage by one-sided strain.

Figs. 4, 5, 6, and $4^a$ show a modified form of scuttle specially suitable for large sizes and for ships in hot climates, where plenty of fresh air is needed for the passengers' comfort. The door A, with glass pane A', is here mounted on a top pivot $A^4$ and bottom pivot $A^5$, which latter is screwed and can be adjusted within the frame D and against the helical spring B at top. By setting the door A in a slanting direction to the ship's side a current of air will be produced, especially when the ship is going, and either so that the fresh air is blown directly into the cabin or the vitiated air drawn out of it. C is an inner ring hinged to the frame at $C^2$ and having rubber ring C' for making joint both against a narrow rim on the door A and a narrow rim on the frame D. This ring C may, as here shown, do service as a dead-door when fitted with a disk or pot-lid $C^x$, which can be attached to the ring C by means of bolts and nuts; or it may be fitted loosely in a recess formed in the glass door A. The ring E has a toothed part $E^2$, which gears with the detachable pinion F, provided with handle F'. The ring has cleats E', which take under wedge-shaped lugs D' on the frame D.

Figure 10:
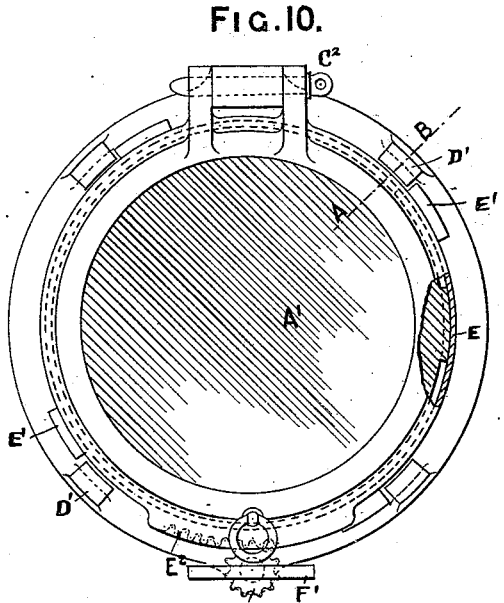

Figs. 7, 8, and 9 show a similar form, but without the inner hinged door or open frame. This form is more particularly applicable to deck-houses. The ring E is provided with cleats E', which take under the wedge-lugs D' of the frame, and thereby compress the rubber ring C', so as to form a tight joint against the pivoted door A. As the letters refer to the same parts as in the previous example, the construction will be understood without further explanation.

Figure 12:
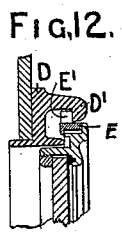
Figure 11:
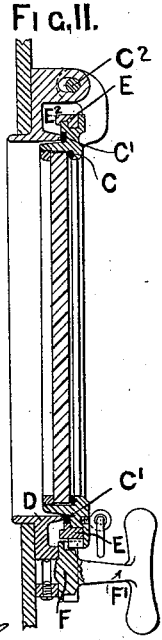

Figs. 10, 11, and 12 show a modification with door pivoted or hinged at the top or at one side. This door C is very similarly arranged to the door C in Figs. 4, 5, and 6, but provided with glass pane. The rotatable ring E, provided with the cleats E', which take under the wedge-lugs D', and provided with the toothed part $E^2$, which gears with the pinion, is similar in form and action to the other examples.

Figs. 13, 14, 15, and 16 show another modification, with glass door A A' mounted on a top pivot $A^4$, having ball-bearing $A^x$ and helical spring B, and on a bottom pivot $A^5$. C is an inner door-frame or ring, (or it might be a blind or dead door, as in Figs. 4 to 6.) This ring or door is in two halves, each hinged at the side, the two halves meeting in the middle and provided with a ring E, also in two halves, one of which is formed with teeth $E^2$, into which gears the pinion F. The ring E has four cleats E', which can engage with four corresponding wedge-pieces D' on the foundation-plate. (See Fig. 16.) The ring halves E are prevented from working off by means of the screws $F^x$ or pins riveted in, the bottom ends of which work in oblong recesses in the ring halves E. By turning the pinion F the ring E is rotated, as in the previous examples, and serves to tighten the ring or door C with its rubber joint-ring C' against the rim of the pivoted glass door A and the rim on the foundation-frame D, as in Figs. 4 to 6. In the position shown in Fig. 13 the hinged ring C can be opened. This form of side scuttle, as well as the one next to be described, has the advantage that the ring or door C, because of being in two halves, can be opened without coming in the way of an inner curtain.

The modification shown in Figs. 17, 18, and 19 differs so far from the last-described form that the door or annular frame C, while made in two halves hinged together in the middle, is hinged to the foundation-frame D at one side. It is pressed up against the rim on the frame D and the rim on the glass door A A' by means of a ring E, in two halves, provided with cleats E' and with teeth $E^2$, which gear with a pinion F, as in the previous examples. Fig. 17 shows it in the position in which the two halves of the ring (or it might be, of course, a dead-door) can be opened, folding up against each other in the middle.

In Figs. 20, 21, 22, and 23 the foundation-frame D is provided with wedge-pieces D' D' at top and bottom (see Fig. 23) and cleats $D'^x$ $D'^x$ at one side, (see Fig. 22,) and the hinged pivoted glass door C is fitted with a ring E, having corresponding wedge-pieces E' and $E'^x$, respectively, which, when the ring is slid laterally, come under the cleats D' and $D'^x$ and cause the rubber ring C' in the door C to make joint with the frame D. The ring E is slid laterally in one direction or the other by means of the nut on the screw F, which is hinged to the ring E and passes between lugs on frame D. When the ring has been slid free of the cleats on the frame D and the hinged screw F is lifted up, the door C can be swung back.

Having fully described our invention, what we desire to claim, and secure by Letters Patent, is—

1. A side scuttle consisting of a foundation-frame provided with inclined planes, a ring with corresponding cleats, means for sliding the ring so as to make the inclined planes engage with the cleats, and a door pivoted to the foundation-frame, which door makes tight joint with the foundation-frame when the inclined planes and cleats are pressed together, substantially as set forth.

2. A side scuttle consisting of a foundation-frame with four-sided opening and provided with inclined planes, a four-sided door hinge-pivoted to the said frame, a ring adapted to slide round on the door and having cleats corresponding with the inclined planes on the frame, and means for rotating the ring, substantially as set forth.

3. In a side scuttle having a foundation-frame with four-sided opening, a four-sided door hinge-pivoted thereto, a ring rotatable on the said door, provided with cleats and adapted to engage with inclined planes on the frame for making joint between the frame and the door, and a round glazed door hinge-pivoted at one side and fixable by a screw at the other side to the four-sided door and adapted to make joint therewith, substantially as set forth.

4. In combination with a side-scuttle frame having inclined planes and provided with a door pivot-hinged thereto, which door has a rubber ring for making joint with a rim on the frame and has a rotatable ring with cleats adapted to engage with the inclined planes on the frame, and a glazed door pivoted therein and having a rim for making joint with the rubber ring on the pivot-hinged door, substantially as set forth.

5. In combination with a side-scuttle frame, a glazed door having at top a pivot with helical spring and ball-bearing and at bottom a screwed adjustable pivot, substantially as set forth.

6. In combination with a side-scuttle frame D, provided with wedge-shaped lugs or pieces D', and a rotatable ring E, provided with corresponding cleats E', adapted to engage the pieces D', and with a toothed portion $E^2$, of a pinion F, mounted in the frame D and engaging the toothed portion $E^2$ of ring E, as and for the purpose specified.

EDWIN JAMES PRESTON.
EDWIN WILLIAM DE RUSETT.
W. MULLAN.
JNO. McKIRDY.

Witnesses as to Edwin James Preston and Edwin William De Rusett:
T. F. DILLON CROKER,
49 *Upper Bedford Place, Russell Square.*
H. T. BRISCOE,
*Oakville, Lewin Road, Streatham.*

Witnesses as to W. Mullan:
W. L. WHEELER,
*Solicitor, St. George's Hall, Belfast.*
GEORGE BAXTER,
*Writing-clerk, 67 High Street, Belfast.*

Witnesses as to Jno. McKirdy:
FREDERIC GEORGE WHITING,
*Church End, Finchley, N.*
JAMES FINDLAY,
34 *Leadenhall Street, E. C.*